United States Patent [19]
Torii

[11] Patent Number: 5,085,394
[45] Date of Patent: Feb. 4, 1992

[54] FLAT DISPLAY SUPPORTING MECHANISM
[75] Inventor: Katsuhiro Torii, Morioka, Japan
[73] Assignee: Alps Electric Co., Ltd., Tokyo, Japan
[21] Appl. No.: 469,623
[22] Filed: Jan. 24, 1990
[30] Foreign Application Priority Data

Feb. 7, 1989 [JP] Japan .................................. 1-13344

[51] Int. Cl.$^5$ .............................................. F16M 13/00
[52] U.S. Cl. ...................................... 248/455; 248/919
[58] Field of Search ............... 248/455, 454, 456, 449,
248/473, 480, 298, 297.2, 917, 918, 919, 920,
921, 922, 923, 924, 676, 679, 639, 652; 400/718;
361/394

[56] References Cited

U.S. PATENT DOCUMENTS

| 4,571,456 | 2/1986 | Paulsen et al. |
| 4,830,328 | 5/1989 | Takach, Jr. ........................ 248/676 |
| 4,859,092 | 8/1989 | Makita ............................... 248/921 |
| 4,960,256 | 10/1990 | Chihara. |

FOREIGN PATENT DOCUMENTS

| 178800 | 4/1986 | European Pat. Off. ............ 361/394 |
| 2223875 | 1/1988 | United Kingdom. |
| 2200783 | 8/1989 | United Kingdom. |

Primary Examiner—David M. Purol
Assistant Examiner—David M. Olson
Attorney, Agent, or Firm—Guy W. Shoup; B. Noel Kivlin

[57] ABSTRACT

The invention provides a flat display supporting mechanism for a portable input/output device such as a computer or a word processor which employs a flat display having a large display area formed in a flat plate profile with a pivotable link attached between a back portion of the display and a device body. The device has a flat profile in a closed position. When the device is to be used, the display which is covering a keyboard is pivoted upwards together with the link. As the display reaches a vertical position the link having two pivot points around which the display is pivoted separates from the display and a lower portion of the flat display is moved away from the pivot point and towards the keyboard along a guide provided on the device body to a position where the flat display is positioned near the keyboard on the device body while a center portion of the display is supported by the link. At this open position, the device can be operated while observing the display area of the flat display only a short distance away from the keyboard and operator.

5 Claims, 4 Drawing Sheets

FLAT DISPLAY SUPPORTING MECHANISM

BACKGROUND OF THE INVENTION

1. Field of the Invention

This invention relates to a flat display supporting mechanism for supporting a flat display on a portable input/output device such as a computer or word processor.

2. Description of the Prior Art

Input/output devices such as computers and word processors are sometimes constructed to be portable, normally called lap-top or hand-held types of devices. These devices generally have a flat display formed in a flat plate profile which is pivotally supported for opening and closing on the body of the device (device body) which is also formed in a flat plate profile and has a keyboard provided thereon.

Conventional flat display supporting mechanisms used with an input/output devices of the type mentioned above are described as follows:

Referring first to FIGS. 4A, 4B, and 4C. These figures show an example of one conventional flat display supporting mechanism. An input/output device 1 has a device body 2 formed in a flat plate profile having a rectangular shape in plan. A parallelepiped-like projection 3 is formed at a rear portion of the device body 2 while a keyboard 4 is formed on an upper face of a front portion of the device body 2. A support shaft 5 is disposed at a front portion of the projection 3 of the device body 2 and extends transversely along the projection 3, and a flat display 6 having a flat plate profile is supported for pivotal motion around the support shaft 5. A display section 7, which may be a liquid crystal display panel, is formed on the flat display 6 such that it faces directly down towards the keyboard when the device 1 is closed, as seen in FIG. 4A. When closed the flat display 6 cooperates with the device body 2 to generally present a substantially parallelepiped shape, as seen in FIG. 4A.

With the input/output device 1 having the construction described above, when it is in the closed position wherein the flat display 6 lies down close to the keyboard 4 as shown in FIG. 4A, it can be carried conveniently.

On the other hand, when the input/output device 1 is to be used, the flat display 6 is pivoted, in the clockwise direction in FIG. 4A, around the support shaft 5 until it is stopped in an inclined position where the back of the display 6 is supported by the projection 3 of the device body 2 as seen in FIG. 4B or 4C. Consequently, the keyboard 4 is exposed, and the display section 7 of the flat display 6 is facing obliquely upwardly. Accordingly, desired operations can be performed with the input/output device 1 by operating keys of the keyboard 4 while observing the display section 7.

FIGS. 5A, 5B and 5C, show another example of a conventional flat display supporting mechanism. An input/output device 1 has a generally similar construction to the input/output device 1 shown in FIGS. 4A, 4B, and 4C. It is only different in that a projection 3A of a device body 2 occupies a substantial portion of the rear half of the device body 2, that is, the projection 3A extends forward towards the keyboard 4 to a substantially central position of the device body 2. This causes the vertical dimension of a flat display 6A, having a display section 7A thereon, to be reduced when compared to the flat display 6 shown in FIGS. 4A, 4B, and 4C. The construction of the remaining parts of the input/output device 1 are similar to the input/output device 1 shown in FIGS. 4A, 4B, and 4C, and accordingly, description thereof is omitted herein to avoid redundancy.

The input/output device 1 of the construction shown in FIGS. 5A, 5B, and 5C can be operated in a similar manner to that of the input/output device shown in FIGS. 4A, 4B, and 4C.

The input/output devices shown in FIGS. 4A, 4B, 4C, 5A, 5B, and 5C, however, have the following drawbacks.

When the input/output device 1 shown in FIGS. 4A, 4B, and 4C, is used, the flat display 6 is spaced a great distance from the keyboard 4 as seen in FIGS. 4B and 4C. Consequently, the display section 7 of the flat display 6 is positioned far from an operator and cannot be observed well. Also, since the flat display 6 extends rearwardly farther than the rear end of the device body 2 as indicated by the dimension "a" in FIG. 4C, full opening of the flat display 6 may be hindered, when there is something behind the device body 2.

When the input/output device 1 shown in FIGS. 5A, 5B, and 5C, is used, the flat display 6A is not spaced a great distance from the keyboard 4 nor does it extend rearwardly farther than the rear end of the device body 2. However, since the area of the front surface of the flat display 6A is smaller than that of the flat display 6 of the input/output device 1 shown in FIGS. 4A, 4B, and 4C, the area of the display section 7A is smaller than that of the display section 7 of the input/output device 1 shown in FIGS. 4A, 4B and 4C. Consequently, a display image on the display section 7A is either proportionally smaller in size and cannot be observed well or provides a view of only a reduced portion of the image of anyone time, which is not preferred.

SUMMARY OF THE INVENTION

It is an object of the present invention to provide a flat display supporting mechanism which, when a flat display having a large display area is to be used, can be positioned near a keyboard to facilitate observation of a display section of the flat display and which does not extend substantially if at all farther than a rear end of a device body.

In the present invention, a flat display supporting mechanism is provided for supporting a flat display and to provide opening and closing of the flat display. The mechanism has a pivoting link for supporting the flat display on the device body, and a guide means formed on the device body for guiding a lower portion of the flat display forward toward a keyboard when the flat display is opened.

When the flat display having a large display area is to be used, it can be positioned near the keyboard on the device body by moving the lower portion of the flat display towards the keyboard along the guide means on the device body. Accordingly, a display section having a large display area can be observed well at a short distance. Also, the extension of the flat display substantially if at all farther than the rear end of the device body is prevented.

The above and other objects, features and advantages of the present invention will become apparent from the following description and the appended claims, taken in conjunction with the accompanying drawings in which like parts are denoted by like reference characters throughout the drawings.

BRIEF DESCRIPTION OF THE DRAWINGS

FIGS. 1A and 1B are perspective views which show a closed position and an open position of the input/output device, respectively. FIG. 1C is a side elevational view of the input/output device in the open position.

DETAILED DESCRIPTION OF THE PREFERRED EMBODIMENT

Figure 1A:
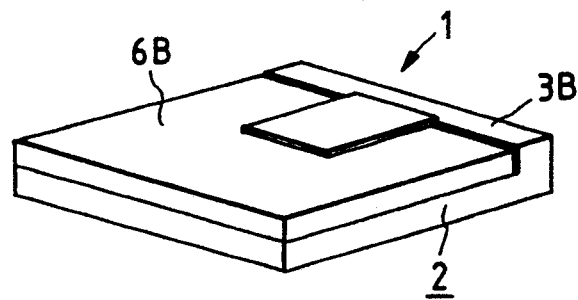
FIGS. 1A, 1B, and 1C show an input/output device in which a flat display supporting mechanism according to the present invention is incorporated.
Figure 1B:
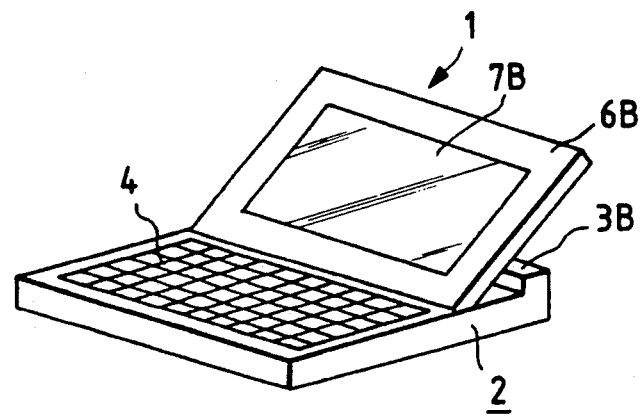

Referring to FIGS. 1A, 1B, 1C, 2, and 3. An input/output device 1 is shown in which a flat display supporting mechanism according to the present invention is incorporated. The input/output device 1, generally a lap top or hand held data processing device such as a computer or word processor, includes a device body 2 formed of a molded material, preferably plastic which has a projection 3B formed at a rear portion thereof. The projection 3B has a substantially similar shape to that of the projection 3 of the input/output device 1 shown in FIGS. 4A, 4B, and 4C described above. At a surface location of a substantially central portion of the projection 3B along the longitudinal axis of projection 3B, a link 9, preferably in the form of a plate, preferably constructed of plastic, is supported for pivotal motion around a support shaft 8, preferably constructed of stainless steel which extends in the longitudinal direction of the projection 3B.

Figure 3:
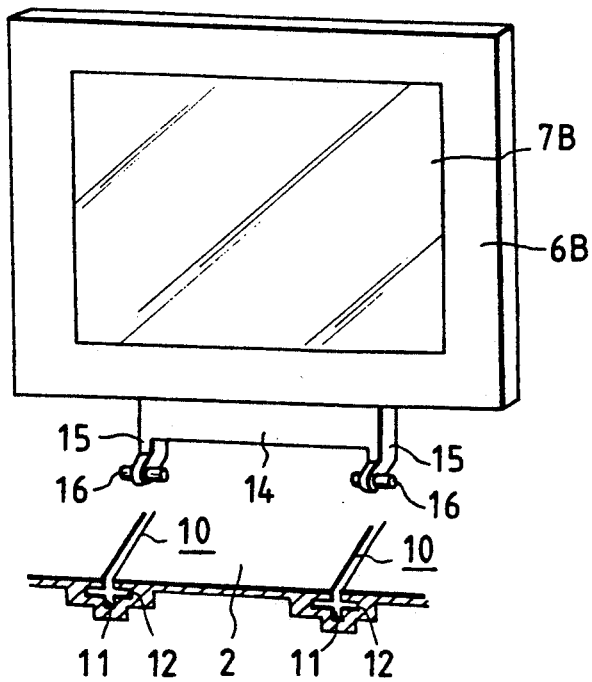
FIG. 3 is a perspective view showing details of guide grooves and leg portions of the flat display supporting device shown in FIGS. 1A, 1B, and 1C.
Figure 4A:
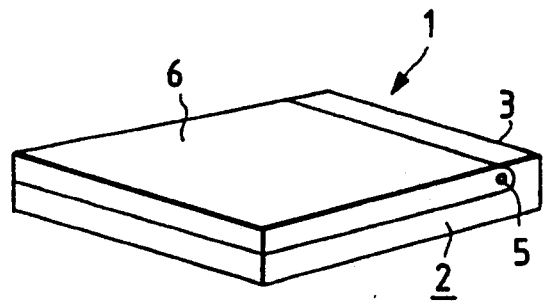
FIGS. 4A, 4B, and 4C are views similar to FIGS. 1A, 1B, and 1C, respectively, but showing a conventional flat display supporting mechanism.
Figure 4B:
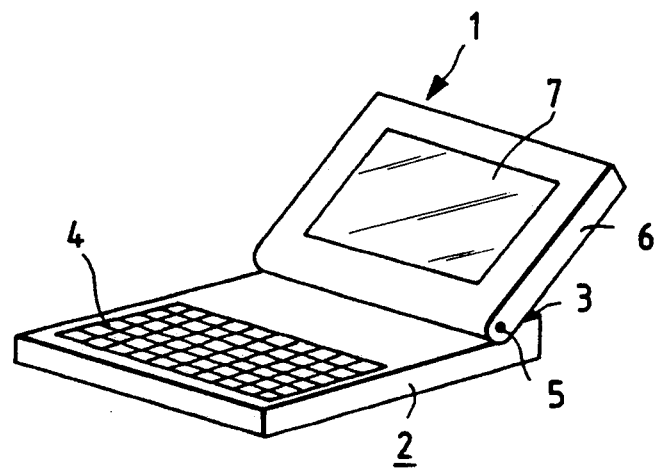
Figure 4C:
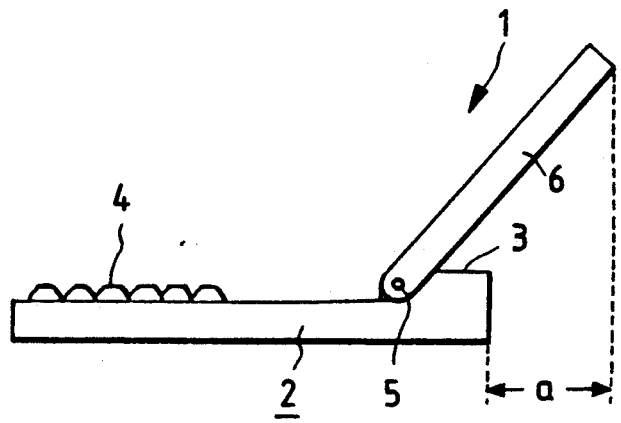
Figure 5A:
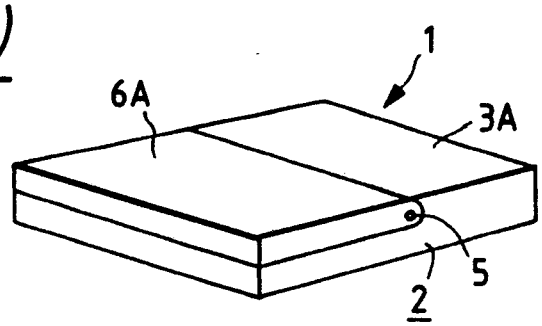
FIGS. 5A, 5B, and 5C are views also similar to FIGS. 1A, 1B, and 1C, respectively, but showing another conventional flat display supporting mechanism.
Figure 5B:
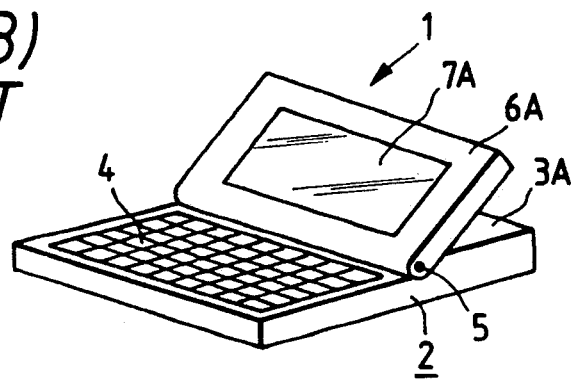
Figure 5C:
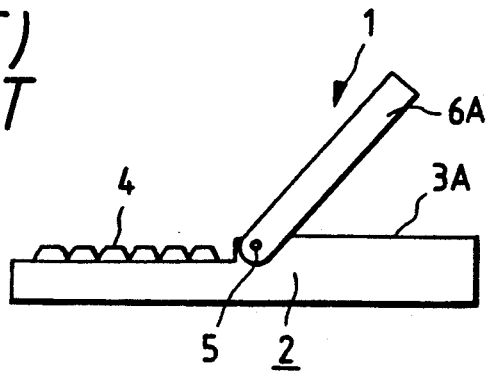

As particularly seen in FIG. 3, a pair of guide grooves 10, are formed parallel to each other in a spaced relationship on an upper surface of the device body 2 between the projection 3 and the keyboard 4. The guide grooves 10 serve as a guide means which extends across the device body 2 in a direction perpendicular to the longitudinal axis of projection 3B. Each of the guide grooves 10 has a substantially cross-shaped cross section including a vertical groove 11 and a horizontal groove 12 which intersect at a substantially central location of the vertical groove 11 in the vertical direction.

A flat display 6B is shaped and dimensioned such that it covers substantially the entire area of the device body 2 except the projection 3B. The flat display 6B has a display section 7B having a comparatively large display area. The link 9 is supported at an end portion thereof, for pivotal motion on back of the flat display 6B at a location a little below a central portion in the vertical direction by means of another support shaft 13, preferably constructed of stainless steel, which extends parallel to the support shaft 8. The flat display 6B is supported for pivotal motion on the link 9.

A bracket 14, preferably constructed of plastic, extends from a central location of a lower end of the flat display 6B. A pair of leg portions 15, preferably constructed of plastic, having substantially identical dimensions extend from opposite ends of the bracket 14 down and to the front of the display 6B. Each leg portion 15 is formed in an L-shape with the lower leg of the "L" bent towards the front of the flat display 6B at a lower portion thereof so as to allow the flat display 6B to be pivoted through a sufficiently large angle to accommodate both a closed position and an open position of the display 6. A pin 16, preferably constructed of plastic, is securely mounted at and extends laterally, parallel to the shafts 8 and 13 from a lower end portion of each leg portion 15. The leg portions 15 and the pins 16 are so shaped and dimensioned that they slide smoothly in the vertical grooves 11 and the horizontal grooves 12 of the guide grooves 10, respectively.

Thus, the flat display 6B is supported for pivotal motion on the link 9 which is in turn mounted for pivotal motion on the projection 3B of the device body 2 while the leg portions 15 of the flat display 6B are held fitted in the guide grooves 10 formed in the top surface of the device body 2. In this configuration, when the mechanism is in its closed position, as seen in FIG. 1A, the flat display 6B substantially covers the device body 2, and the leg portions 15 are positioned at end portions of the guide grooves 10 adjacent the projection 3B.

When the input/output device 1 is to be used, the flat display 6B is pivoted from the closed position, as shown in FIG. 1A in the clockwise direction, around a first axis of rotation, at or between the support shaft 8 and the pins 16. As the flat display 6B is pivoted upwards around the first axis of rotation, the pins 16 at first remain almost at the end portions of the guide grooves 10 closest to the projection 3B until the flat display 6B comes to a vertical position. However, when the flat display 6B is pivoted past the vertical position toward the projection 3B of the device body 2, the center of the axis of rotation moves to support shaft 13 and a component of force is produced which tends to move the legs 15 and pins 16 towards the keyboard 4 along the vertical grooves 11 and horizontal grooves 12, respectively, of the guide grooves 10. As a result, the lower portion of the flat display 6B is moved towards the keyboard 4 until the leg portions 15 come to the end portions of the guide grooves 10 adjacent the keyboard 4. The flat display 6B is thus stopped at a position shown in FIG. 1C.

Figure 1C:
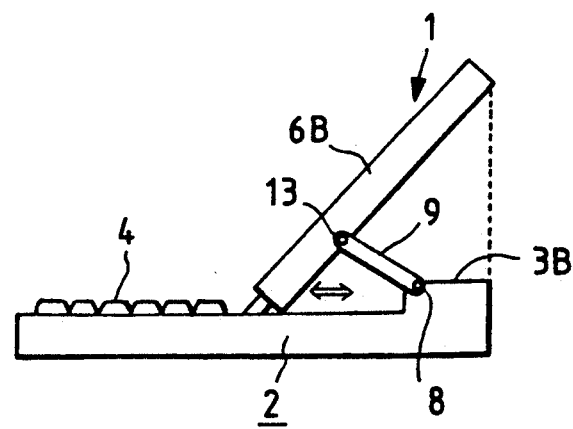
Figure 2:
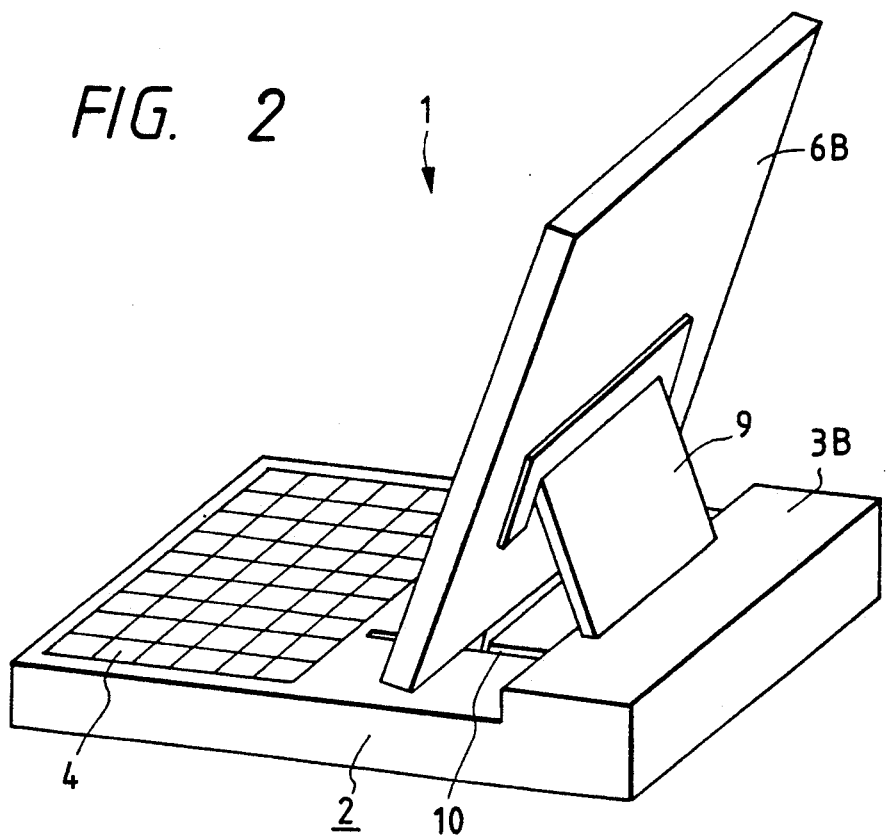
FIG. 2 is an enlarged perspective view showing the open position of the input/output device shown in FIGS. 1A, 1B, and 1C.

In the open position of the input/output device 1 shown in FIG. 1C, the flat display 6B having the display section 7B having a comparatively large display area is positioned near the keyboard 4. Accordingly, the display section 7B can be observed well. Also, since the flat display 6B does not extend substantially if at all beyond the rear end of the device body 2, the use of the input/output device 1 is not hindered by an article behind the input/output device 1.

In order to return the flat display 6B from the open position to the closed position, it is pivoted in the counter clockwise direction as shown in FIG. 1C around the support shaft 13. Thereupon, the leg portions 15 are moved in the guide grooves 10 toward the projection 3B until the position shown in FIG. 1A is reached.

With the input/output device 1 having a construction as described above, a display image can be observed well because the lower portion of the flat display 6B is positioned near the keyboard 4, and the input/output device 1 can be used conveniently because the flat display 6B does not extend substantially if at all beyond the rear end of the device body 2. Also, since the input/output device 1 presents a flattened profile in its closed condition, it can be carried conveniently.

Having now fully described the invention, it will be apparent to one of ordinary skill in the art that many changes and modifications can be made thereto without departing from the spirit and scope of the invention as set forth herein.

What is claimed is:

1. A flat display supporting mechanism, for supporting a flat display and allowing opening and closing movement of the flat display on a device body, comprising:

a device body having a top surface;

a flat display having a back portion and a lower portion;

a link operatively coupled between said top of said device body and the back of the said flat display to facilitate pivotal motion of the flat display about a first end of said link and to facilitate pivotal motion of a second end of said link about said top of said device body, wherein said pivotal link between said flat display and said first end of said link forms a link angle; and guide means formed on said device body for guiding said lower portion of said flat display along said top surface of said device body away from said link as said link angle increases to a maximum during opening movement of said flat display and toward said link as said link angle decreases to a minimum during closing movement.

2. A flat display supporting mechanism according to claim 1, wherein said guide means includes at least one guide groove formed in said device body, and said flat display has an engaging portion formed at said lower portion thereof for sliding engagement with said guide groove.

3. A flat display supporting mechanism according to claim 1, wherein said guide means includes at least one guide groove formed in said device body, and said flat display has an L-shaped bent leg portion provided at said lower portion thereof, said leg portion of said flat display having an engaging portion formed at an end portion thereof for sliding engagement with said guide groove.

4. A flat display supporting mechanism according to claim 1, wherein said machine body is a portable computer.

5. A flat display supporting mechanism according to claim 1, wherein said machine body is a word processor.

* * * * *